United States Patent
Lee et al.

(10) Patent No.: US 10,953,797 B2
(45) Date of Patent: Mar. 23, 2021

(54) CLOAKING DEVICES WITH CONVERGING LENSES AND COHERENT IMAGE GUIDES AND VEHICLES COMPRISING THE SAME

(71) Applicant: Toyota Motor Engineering & Manufacturing North America, Inc., Plano, TX (US)

(72) Inventors: Kyu-Tae Lee, Ann Arbor, MI (US); Mindy Zhang, Ann Arbor, MI (US); Debasish Banerjee, Ann Arbor, MI (US); Songtao Wu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/946,065

(22) Filed: Apr. 5, 2018

(65) Prior Publication Data

US 2019/0308557 A1 Oct. 10, 2019

(51) Int. Cl.
*B60R 1/00* (2006.01)
*G02B 23/00* (2006.01)
*G02B 6/26* (2006.01)

(52) U.S. Cl.
CPC ............. *B60R 1/00* (2013.01); *G02B 6/26* (2013.01); *G02B 23/00* (2013.01); *B60R 2300/802* (2013.01)

(58) Field of Classification Search
CPC .............. B60R 1/00; G02B 23/00; G02B 6/26
See application file for complete search history.

(56) References Cited

U.S. PATENT DOCUMENTS

| 3,016,785 A | * | 1/1962 | Kapany | ................... G02B 6/06 348/359 |
| 4,756,615 A | * | 7/1988 | Hildebrand | .......... G02B 27/024 353/119 |

(Continued)

FOREIGN PATENT DOCUMENTS

| CN | 101299079 A | 11/2008 |
| CN | 104950428 B | 12/2017 |
| WO | 2017007526 A2 | 1/2017 |

OTHER PUBLICATIONS

Chen et al., Fiber Optic Projection-Imaging System for Shape Measurement in Confined Space, The Scientific World Journal, vol. 2014, Article ID 206569, 10 pages, http://dx.doi.org/10.1155/2014/206569 (Year: 2014).*

(Continued)

*Primary Examiner* — Peter Radkowski
(74) *Attorney, Agent, or Firm* — Dinsmore & Shohl LLP (57) ABSTRACT

A cloaking device with an object-side, an image-side, and a cloaked region is provided. A first object-side converging lens and a second object-side converging lens are positioned on the object-side, and a first image-side converging lens and a second image-side converging lens are positioned on the image-side. A coherent image guide with an object-side end optically aligned with the second object-side converging lens and an image-side end optically aligned with the second image-side converging lens is included. Light from an object positioned on the object-side of the cloaking device is focused in parallel onto the object-side end of the coherent image guide by the first object-side converging lens and the second object-side converging lens, propagates through the coherent image guide, and is focused in parallel by the second image-side converging lens and the first image-side converging lens to form an image of the object on the image-side of the cloaking device.

20 Claims, 6 Drawing Sheets

(56) References Cited

U.S. PATENT DOCUMENTS

| | | | | |
|---|---|---|---|---|
| 4,963,906 A * | 10/1990 | Goodman | ............... | G03B 13/00 348/E5.047 |
| 5,208,891 A * | 5/1993 | Prysner | .................... | G02B 6/06 352/129 |
| 6,607,280 B2 * | 8/2003 | Koyama | .............. | H04N 9/3105 348/E5.141 |
| 6,718,103 B2 * | 4/2004 | Cruz | ........................ | G02B 6/32 362/385 |
| 6,813,440 B1 * | 11/2004 | Yu | .......................... | G03B 29/00 250/237 G |
| 7,206,131 B2 * | 4/2007 | Alden | .................... | G02B 26/06 359/618 |
| 7,733,583 B2 * | 6/2010 | Fujiwara | .............. | G02B 23/243 359/784 |
| 8,755,059 B2 * | 6/2014 | LeGrande | .............. | G03B 29/00 348/744 |
| 9,557,547 B2 | 1/2017 | Choi et al. | | |
| 2002/0025114 A1 * | 2/2002 | Cruz | ........................ | G02B 6/32 385/33 |
| 2002/0090131 A1 * | 7/2002 | Alden | .................... | G02B 26/06 382/154 |
| 2002/0117605 A1 * | 8/2002 | Alden | ...................... | F41H 3/00 250/208.1 |
| 2003/0086253 A1 * | 5/2003 | Koyama | .............. | H04N 9/3105 362/601 |
| 2003/0147254 A1 * | 8/2003 | Yoneda | .................. | G01B 11/00 362/551 |
| 2004/0190843 A1 * | 9/2004 | Cruz | ........................ | G02B 6/32 385/116 |
| 2005/0175311 A1 * | 8/2005 | Brunson | .................. | G02B 6/06 385/147 |
| 2006/0131478 A1 * | 6/2006 | Alden | .................... | G02B 26/06 250/208.1 |
| 2009/0052062 A1 * | 2/2009 | Fujiwara | ................ | G02B 21/02 359/784 |
| 2015/0138753 A1 * | 5/2015 | Furuta | ..................... | H04N 9/07 362/84 |

OTHER PUBLICATIONS

Koschwanez et al., Picture Perfect, Image Processing and Analysis Improves Microscopic Images Captured With Fiber Bundles, SPIE's oemagazine, 2004 (Year: 2004).*

Helen D. Ford and Ralph P. Tatam, "Characterization of optical fiber imaging bundles for swept-source optical coherence tomography," Appl. Opt. 50, 627-640 (2011) (Year: 2011).*

Orth et al., Extended depth of field imaging through multicore optical fibers, Optics Express, V. 26, N. 5, Mar. 5, 2018 (Year: 2018).*

Dodson, Brian, "Make your own invisibility cloak with a 3D printer", May 12, 2013; URL: https://newatlas.com/invisibility-cloak-plastic-3d-printed/27433/.

* cited by examiner

CLOAKING DEVICES WITH CONVERGING LENSES AND COHERENT IMAGE GUIDES AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device comprises an object-side, an image-side, and a cloaked region. A first object-side converging lens with a first object-side focal length and a second object-side converging lens with a second object-side focal length are positioned on the object-side, and a first image-side converging lens with a first image-side focal length and a second image-side converging lens with a second image-side focal length are positioned on the image-side. A coherent image guide with an object-side end optically aligned with the second object-side converging lens and an image-side end optically aligned with the second image-side converging lens is included. Light from an object positioned on the object-side of the cloaking device and obscured by the cloaked region is focused in parallel onto the object-side end of the coherent image guide by the first object-side converging lens and the second object-side converging lens. Light focused in parallel onto the object-side end of the coherent image guide propagates through the coherent image guide and exits at the image-side end. Light that exits the image-side end of the coherent image guide is focused in parallel by the second image-side converging lens and the first image-side converging lens to form an image of the object on the image-side of the cloaking device such that the light from the object appears to pass through the cloaked region.

The first object-side converging lens and the first image-side converging lens may each comprise an outward facing convex surface and an inward facing planar surface, and the second object-side converging lens and the second image-side converging lens may each comprise an inward facing convex surface and an outward facing planar surface. In some embodiments, the first object-side converging lens, the second object-side converging lens, the first image-side converging lens and the second image-side converging lens may be plano-convex lenses or Fresnel lenses. In other embodiments, the first object-side converging lens, the second object-side converging lens, the first image-side converging lens and the second image-side converging lens may be a combination of plano-convex lenses and Fresnel lenses.

The first object-side converging lens and the second object-side converging lens may be spaced apart from each other by a distance equal to the sum of the first object-side focal length and the second object-side focal length. Also, the first image-side converging lens and the second image-side converging lens may be spaced apart from each other by a distance equal to the sum of the first image-side focal length and the second image-side focal length. In some embodiments, the first object-side focal length is greater than the second object-side focal length and the first image-side focal length is greater than the second image-side focal length. The first object-side converging lens may comprise a first object-side focal line, the second object-side converging lens may comprise a second object-side focal line, the first image-side converging lens may comprise a first image-side focal line, and the second image-side converging lens may comprise a second image-side focal line. The first object-side focal line and the second object-side focal line may be positioned between the first object-side converging lens and the second object-side converging lens, and the first image-side focal line and the second image-side focal line may be positioned between the first image-side converging lens and the second image-side converging lens. In some embodiments, the first object-side focal line and the second object-side focal line may be collinear, and the first image-side focal line and the second image-side focal line may be collinear.

Light from the object on the object-side of the cloaking device may be focused onto the first object-side focal line by the first object-side converging lens, diverge between the first object-side focal line and the outward facing planar surface of the second object-side converging lens, and be focused in parallel onto the object-side end of the coherent image guide by the second object-side converging lens. Light focused in parallel onto the object-side end of the coherent image guide exits through the image-side end, propagates parallel to the inward facing convex surface of the second image-side converging lens and is focused onto the second image-side focal line by the second image-side converging lens. The light focused onto the second image-side focal line diverges between the second image-side focal line and the inward facing planar surface of the first image-side converging lens, and is focused in parallel by the first image-side converging lens to form the image of the object on the image-side of the cloaking device. Accordingly, light from the object on the object-side of the cloaking device may propagate through the cloaking device via an optical path of: object—first object-side converging lens—second object-side converging lens—object-side end of coherent image guide—image-side end of coherent image guide—second image-side converging lens—first image-side converging lens—image. That is, light may propagate through the cloaking device via an optical path of: object—outward facing convex surface of first object-side converging lens—inward facing planar surface of first object-side converging lens—outward facing planar surface of second object-side converging lens—inward facing convex surface of second object-side converging lens—object-side end of coherent image guide—image-side end of coherent image guide—inward facing convex surface of second image-side converging lens—outward facing planar surface of second image-side converging lens—inward facing planar surface of first image-side converging lens—outward facing convex surface of first image-side converging lens—image.

In another embodiment, a cloaking device assembly comprises an object-side, an image-side, a cloaked region, and a cloaked article positioned within the cloaked region. A pair of object-side converging lenses are positioned on the object-side and a pair of image-side converging lenses are positioned on the image-side. The pair of object-side converging lenses each have a focal length, a focal line positioned at the focal length, and are spaced apart from each other by a distance equal to a sum of the focal lengths of the pair of object-side converging lenses. The pair of image-side converging lenses each have a focal length, a focal line positioned at the focal length, and are and spaced apart from each other by a distance equal to a sum of the focal lengths of the pair of image-side converging lenses. A coherent image guide comprising an object-side end and an image-side end is included, and the object-side end is optically aligned with one of the pair of object-side converging lenses and the image-side end is optically aligned with one of the pair of image-side converging lenses. Light from an object positioned on the object-side of the cloaking device and obscured by the cloaked region is focused in parallel onto the object-side end of the coherent image guide by the pair of object-side converging lenses. Light focused in parallel onto the object-side end of the coherent image guide propagates through the coherent image guide and exits at the image-side end. Light that exits the image-side end of the coherent image guide is focused in parallel by the pair of image-side converging lenses to form an image of the object on the image-side of the cloaking device such that the light from the object appears to pass through the cloaked region. One of the pair of object-side converging lenses and one of the pair of image-side converging lenses comprise an outward facing convex surface and an inward facing planar surface. Also, another of the pair of object-side converging lenses and another of the pair of image-side converging lenses comprise an inward facing convex surface and an outward facing planar surface. Light from the object on the object-side of the cloaking device assembly propagates through the cloaking device assembly via an optical path of: object—one of the pair of object-side converging lens—another of the pair of object-side converging lens—object-side end of coherent image guide—image-side end of coherent image guide—one of the pair of converging lens—another of the pair of converging lens—image.

In still another embodiment, a vehicle comprises an A-pillar and a cloaking device positioned on the A-pillar. The cloaking device comprises an object-side, an image-side, and a cloaked region. The A-pillar is positioned within the cloaked region, the object-side is positioned on an exterior of the vehicle and the image-side is positioned within an interior of the vehicle. A first object-side converging lens with a first object-side focal length and a second object-side converging lens with a second object-side focal length are positioned on the object-side. The first object-side converging lens and the second object-side converging lens are spaced apart from each other by a distance equal to a sum of the first object-side focal length and the second object-side focal length. A first image-side converging lens with a first image-side focal length and a second image-side converging lens with a second image-side focal length are positioned on the image-side. The first image-side converging lens and the second image-side converging lens are spaced apart from each by a distance equal to a sum of the first image-side focal length and the second image-side focal length. A coherent image guide comprising an object-side end and an image-side end is included and the object-side end is optically aligned with the second object-side converging lens and the image-side end is optically aligned with the second image-side converging lens. Light from an object positioned on the object-side of the cloaking device and obscured by the cloaked region is focused in parallel onto the object-side end of the coherent image guide by the first object-side converging lens and the second object-side converging lens. Light focused in parallel onto the object-side end of the coherent image guide propagates through the coherent image guide and exits through the image-side end. Light that exits through the image-side end of the coherent image guide is focused in parallel by the second image-side converging lens and the first image-side converging lens to form an image of the object on the image-side of the cloaking device such that the light from the object appears to pass through the cloaked region.

The first object-side converging lens and the first image-side converging lens may each comprise an outward facing convex surface and an inward facing planar surface, and the second object-side converging lens and the second image-side converging lens may each comprise an inward facing convex surface and an outward facing planar surface. In some embodiments, the first object-side converging lens may comprise a first object-side focal line, the second object-side converging lens may comprise a second object-side focal line, the first image-side converging lens may comprise a first image-side focal line, and the second image-side converging lens may comprise a second image-side focal line. In such embodiments, the first object-side focal line and the second object-side focal line may be positioned between the first object-side converging lens and the second object-side converging lens, and the first image-side focal line and the second image-side focal line may be positioned between the first image-side converging lens and the second image-side converging lens. Also, the first object-side focal line and the second object-side focal line may be collinear, and the first image-side focal line and the second image-side focal line may be collinear. Light from the object on the object-side of the cloaking device propagates through the cloaking device via an optical path of: object—first object-side converging lens—second object-side converging lens—object-side end of coherent image guide—image-side end of coherent image guide—second image-side converging lens—first image-side converging lens—image.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a pair of converging lenses on an object-side of the cloaking device, a pair of converging lenses on an image-side of the cloaking device, and a coherent image guide which direct incoming light around a cloaked region. The cloaking devices described herein may utilize plano-convex lenses and/or Fresnel lenses to focus, diverge and re-focus light from an object. Cloaking devices may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the converging lenses and the coherent image guide allow a driver to perceive an image which, if not for the cloaking device, would be obstructed by a pillar of the vehicle. Various embodiments of cloaking devices and methods for using the same will be described in further detail herein with specific reference to the appended drawings.

As used herein, the phrase "converging lens" and "converging lenses" refer to a lens and lenses that focus incident parallel light to a focal point or focal line and focus incident diverging light to parallel light. The term "parallel" and phrases "parallel light" and "light parallel" as used herein to refer to collimated light, i.e., light rays propagating parallel to each other. The terms "diverges" and "diverging" and the phrase "diverging light" as used herein refer to light rays propagating away from each other. Accordingly, a beam of parallel light has a generally constant cross-sectional area with increasing distance traveled by the beam of parallel light and a beam of diverging light has an increasing cross-sectional area with increasing distance traveled by the beam of diverging light. The phrase "coherent image guide" as used herein refers to a physical structure that guides electromagnetic radiation in the visible spectrum. Non-limiting examples of a coherent image guide include a light pipe, an optical fiber, a plurality of optical fibers, a plurality of optical fiber bindles, and the like.

Figure 1:
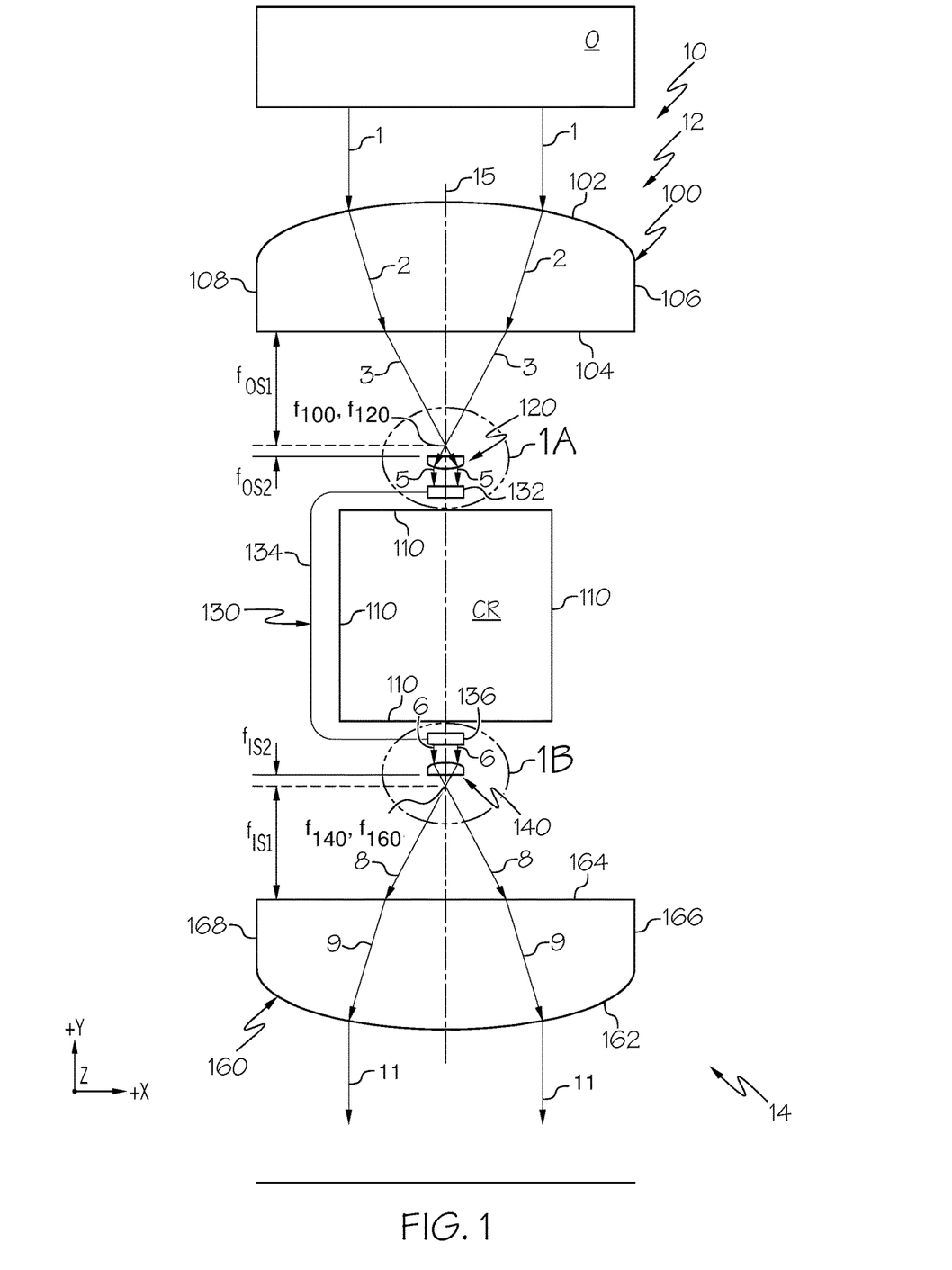
FIG. 1 schematically depicts a top view of a cloaking device according to one or more embodiments disclosed and described herein.

FIG. 1 generally depicts one embodiment of a cloaking device. The cloaking device includes a cloaked region that is at least partially bounded by a pair of converging lenses on an object-side of the cloaking device and a pair of converging lenses on an image-side of the cloaking device. The pair of object-side converging lenses comprise a first object-side converging lens and a second object-side converging lens. The first object-side converging lens may have an outward facing convex surface, an inward facing planar surface, and a first object-side focal length. The second object-side converging lens may have an inward facing convex surface, an outward facing planar surface, and a second object-side focal length. As used herein the phrase "inward facing surface" refers to a surface that faces towards or is proximal to a cloaked region of a cloaking device and the phrase "outward facing surface" refers to a surface facing away or distal from the cloaked region. The pair of image-side converging lenses comprise a first image-side converging lens and a second image-side converging lens. The first image-side converging lens may have an outward facing convex surface, an inward facing planar surface, and a first image-side focal length. The second image-side converging lens may have an inward facing convex surface, an outward facing planar surface, and a second image-side focal length. Extending between the pair of object-side converging lenses and the pair of image-side converging lenses may be a coherent image guide with an object-side end positioned on the object-side of the cloaking device and an image-side end positioned on the image-side of the cloaking device. Light from an object positioned on an object-side of the cloaking device and incident on the first object-side converging lens is focused, diverges and is incident on the second object-side converging lens, as depicted in FIG. 1. Light that is incident on the second object-side converging lens is focused in parallel onto the object-side end of the coherent image guide. Light incident on the object-side end of the coherent image guide exits and propagates through the image-side end of the coherent image guide in parallel and is incident on the second image-side converging lens. Light propagating from the image-side end of the coherent image guide and incident on the second image-side converging lens is focused, diverges and is incident on the first image-side converging lens where it is focused in parallel to provide an image on the image-side of the cloaking device, as depicted in FIG. 1.

Still referring to FIG. 1, embodiments of a cloaking device include a cloaking device assembly 10 with an object-side 12, an image-side 14, and four plano-convex lenses 100, 120, 140, 160. A cloaked region CR is positioned between the plano-convex lenses 100, 120 and the plano-convex lenses 140, 160. Each of the four plano-convex lenses 100, 120, 140, 160 has a length along the X-axis, a thickness along the Y-axis and a height along the Z-axis of the coordinate axes shown in the figures. That is, the X-axis shown in the figures extends along a length of the four plano-convex lenses 100, 120, 140, 160, the Y-axis shown in the figures extends along a thickness of the four plano-convex lenses 100, 120, 140, 160, and the Z-axis shown in the figures extends along a height of the four plano-convex lenses 100, 120, 140, 160. The two plano-convex lenses 100, 120 may be positioned on the object-side 12 of the cloaking device assembly 10 to face an object 'O' and may be referred to herein as object-side plano-convex lenses 100, 120, a pair of object-side plano-convex lenses 100, 120, and/or a first object-side plano-convex lens 100 and a second object-side plano-convex lens 120. The two plano-convex lenses 140, 160 may be positioned on the image-side 14 of the cloaking device assembly 10 to provide an image 'I' formed by the cloaking device assembly 10 and may be referred to herein as image-side plano-convex lenses 140, 160, a pair of image-side plano-convex lenses 140, 160, and/or a first image-side plano-convex lens 160 and a second image-side plano-convex lens 140.

The first object-side plano-convex lens 100 and the first image-side plano-convex lens 160 each have an outward facing convex surface 102, 162, an inward facing planar surface 104, 164, a first end 106, 166, and a second end 108, 168, respectively. The outward facing convex surfaces 102, 162 and the inward facing planar surfaces 104, 164 of the first object-side plano-convex lens 100 and the first image-side plano-convex lens 160, respectively, extend between the first ends 106, 166 and the second ends 108, 168, respectively. The first object-side plano-convex lens 100 has a first object-side focal length $f_{OS1}$ and the first image-side plano-convex lens 160 has a first image-side focal length $f_{IS1}$. In some embodiments, the first object-side focal length $f_{OS1}$ is equal to the first image-side focal length $f_{IS1}$ (i.e., $f_{OS1}=f_{IS1}$). In other embodiments, the first object-side focal length $f_{OS1}$ is not equal to the first image-side focal length $f_{IS1}$ (i.e., $f_{OS1} \neq f_{IS1}$).

Figure 1A:
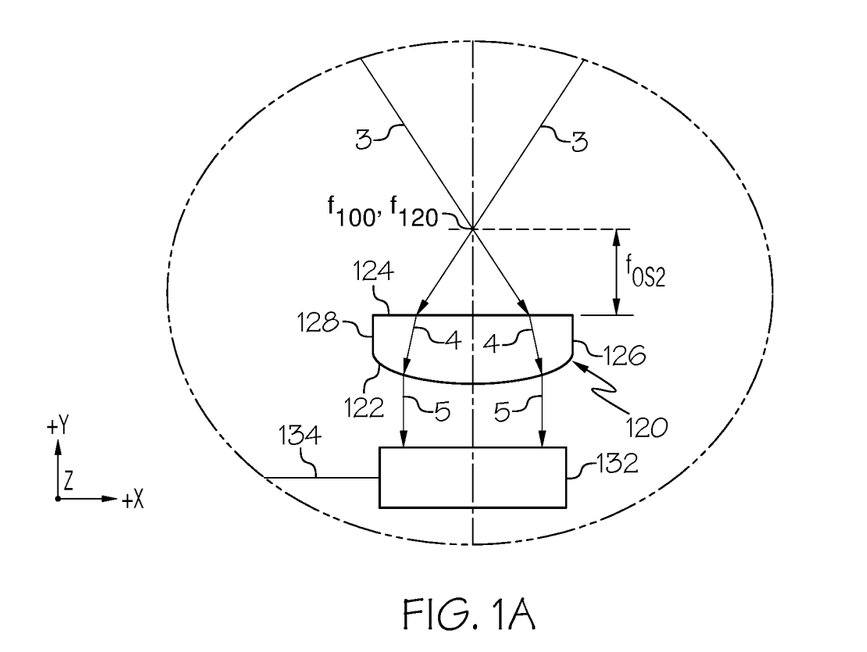
FIG. 1A schematically depicts an enlarged view of section 1A in FIG. 1.
Figure 1B:
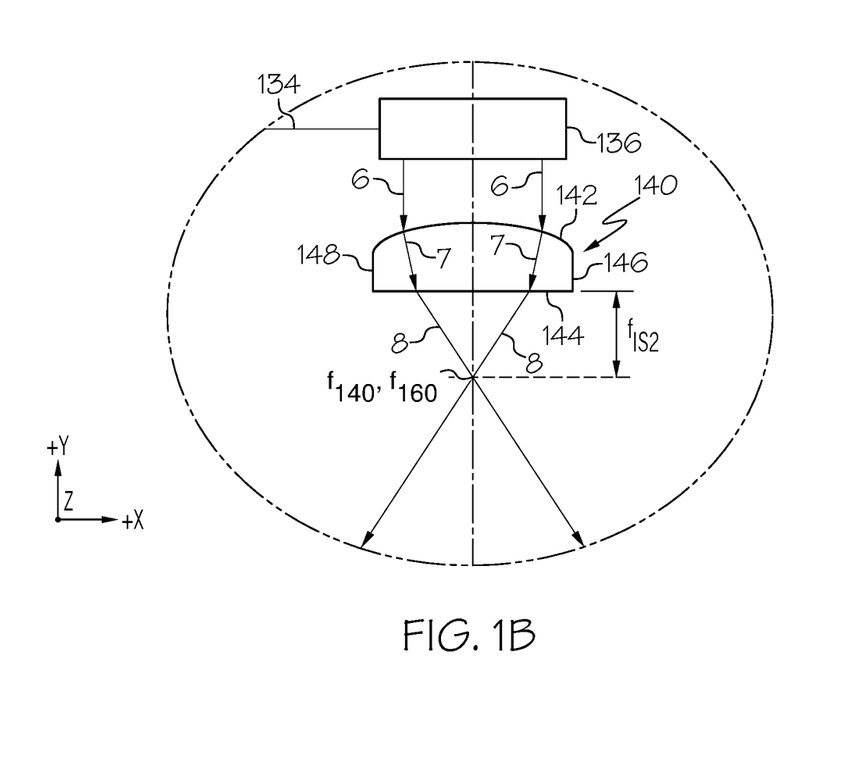
FIG. 1B schematically depicts an enlarged view of section 1B in FIG. 1.

Referring now to FIGS. 1, 1A and 1B, the second object-side plano-convex lens 120 and the second image-side plano-convex lens 140 have an inward facing convex surface 122, 142, an outward facing planar surface 124, 144, a first end 126, 146, and a second end 128, 148, respectively. The inward facing convex surfaces 122, 142 and the outward facing planar surfaces 124, 144 of the second object-side plano-convex lens 120 and the second image-side plano-convex lens 140, respectively, extend between the first ends 126, 146 and the second ends 128, 148, respectively. The second object-side plano-convex lens 120 has a second object-side focal length $f_{OS2}$ and the second image-side plano-convex lens 140 has a second image-side focal length $f_{IS2}$. In some embodiments, the second object-side focal length $f_{OS2}$ is equal to the second image-side focal length $f_{IS2}$ (i.e., $f_{OS2}=f_{IS2}$). In other embodiments, the second object-side focal length $f_{OS2}$ is not equal to the second image-side focal length $f_{IS2}$ (i.e., $f_{OS2} \neq f_{IS2}$).

In some embodiments, the cloaked region CR may be at least partially bounded by a boundary 110. For example, the cloaked region CR may be at least partially bounded by a plurality of boundaries 110. In such embodiments, the cloaked region CR may comprise an article to be cloaked (not shown) and the article may comprise one or more boundaries 110. As used herein, the terms "boundary" and "boundaries" refer to a physical surface.

Extending from the object-side 12 to the image-side 14 is a coherent image guide 130 that provides for the propagation of parallel light there through. The coherent image guide 130 comprises an object-side end 132 optically aligned with the second object-side plano-convex lens 120, an image-side end 136 optically aligned with the second image-side plano-convex lens 140, and an optical waveguide 134 extending between the object-side end 132 and the image-side end 136. As used herein, the phrase "optically aligned" refers to an orientation between two optical components such that generally all light propagating through and from one of the optical components is incident on the other optical component. In some embodiments, the coherent image guide 130 extends around the cloaked region CR from the object-side 12 to the image-side 14 as depicted in FIG. 1. In other embodiments, the coherent image guide 130 extends through at least a portion of the cloaked region CR from the object-side 12 to the image-side 14 (not shown).

In some embodiments, the plano-convex lenses 100, 120, 140, 160, may be cylindrical plano-convex lenses with a cross-section in the X-Z plane which is depicted in the figures as a rectangle. In such embodiments, the first object-side plano-convex lens 100 may comprise a first object-side focal line $f_{100}$ extending along the Z-axis and positioned inwardly (−Y direction) from the first object-side plano-convex lens 100 at the first object-side focal length $f_{OS1}$, and the first image-side plano-convex lens 160 may comprise a first image-side focal line $f_{160}$ extending along the Z-axis and positioned inwardly (+Y direction) from the first image-side plano-convex lens 160 at the first image-side focal length $f_{IS1}$. Also, the second object-side plano-convex lens 120 may comprise a second object-side focal line $f_{120}$ extending along the Z-axis and positioned outwardly (+Y direction) from the second object-side plano-convex lens 120 at the second object-side focal length $f_{OS2}$, and the second image-side plano-convex lens 140 may comprise a second image-side focal line $f_{140}$ extending along the Z-axis and positioned outwardly (−Y direction) from the second image-side plano-convex lens 140 at the second image-side focal length $f_{IS2}$. As depicted in FIGS. 1 and 1A, the first object-side plano-convex lens 100 may be oriented relative to the second object-side plano-convex lens 120 such that the first object-side focal line $f_{100}$ and the second object-side focal line $f_{120}$ are collinear. As depicted in FIGS. 1 and 1B, the first image-side plano-convex lens 160 may be oriented relative to the second image-side plano-convex lens 140 such that the first image-side focal line $f_{160}$ and the second image-side focal line $f_{140}$ are collinear. Accordingly, the first object-side plano-convex lens 100 and the second object-side plano-convex lens 120 may be spaced apart from each other (Y direction) by a distance equal to the sum of the first object-side focal length $f_{OS1}$ and the second object-side focal length $f_{OS2}$ (i.e., the spacing is $f_{OS1}+f_{OS2}$). Also, the first image-side plano-convex lens 160 and the second image-side plano-convex lens 140 may be spaced apart from each other (Y direction) by a distance equal the sum of the first image-side focal length $f_{IS1}$ and the second image-side focal length $f_{IS2}$ (i.e., the spacing is $f_{IS1}+f_{IS2}$).

Still referring to FIG. 1, in other embodiments, the plano-convex lenses 100, 120, 140, 160 may be spherical plano-convex lenses with a cross-section in the X-Z plane depicted in the figures in the shape of a circle. In such embodiments, the first object-side plano-convex lens 100 may comprise a first object-side focal point $f_{100}$ positioned inwardly (−Y direction) from the first object-side plano-convex lens 100 at the first object-side focal length $f_{OS1}$, and the first image-side plano-convex lens 160 may comprise a first image-side focal point $f_{160}$ positioned inwardly (+Y direction) from the first image-side plano-convex lens 160 at the first image-side focal length $f_{IS1}$. Also, the second object-side plano-convex lens 120 may comprise a second object-side focal point $f_{120}$ positioned outwardly (+Y direction) from the second object-side plano-convex lens 120 at the second object-side focal length $f_{OS2}$, and the second image-side plano-convex lens 140 may comprise a second image-side focal point $f_{140}$ positioned outwardly (−Y direction) from the second image-side plano-convex lens 140 at the second image-side focal length $f_{IS2}$. As depicted in FIG. 1, the first object-side plano-convex lens 100 may be oriented relative to the second object-side plano-convex lens 120 such that the first object-side focal point $f_{100}$ and the second object-side focal point $f_{120}$ are the same focal point. Also, the first image-side plano-convex lens 160 may be oriented relative to the second image-side plano-convex lens 140 such that the first image-side focal point $f_{160}$ and the second image-side focal point $f_{140}$ are the same focal point.

In embodiments where the plano-convex lenses 100, 120, 140, 160 are cylindrical plano-convex lenses, the coherent image guide 130 may be a coherent image ribbon (FIG. 3) with a width extending along the Z-axis depicted in figures. That is, the coherent image guide 130 may be formed from a plurality of coherent image fiber bundles, light pipes, optical fibers, etc., aligned to form a ribbon with a width (Z direction) that is greater than a thickness (X and Y directions). In embodiments where the plano-convex lenses 100, 120, 140, 160 are spherical plano-convex lenses, the coherent image guide 130 may be a coherent image cable. That is, the coherent image guide 130 may be formed from one or more image fiber bundles in the shape of a cylindrical cable. It should be understood that each of the coherent image fiber bundles may be formed from hundreds or thousands of individual optical fibers, light pipes, etc.

The plano-convex lenses 100, 120, 140, 160, and other plano-convex lenses disclosed herein, may be formed from any lens material suitable for focusing light rays. Non-limiting examples of suitable plano-convex lens materials include glass, acrylic polymers, polycarbonate polymers and rigid vinyl polymers. The coherent image guide, and other coherent image guides disclosed herein, may be formed from any fiber material suitable for light rays to propagate through. Non-limiting examples of suitable coherent image guide materials include silica, fluoride glass, phosphate glass, chalcogenide glass, polymethyl methacrylate (PMMA), and the like.

The first object-side plano-convex lens 100 is positioned relative to the second object-side plano-convex lens 120 such that light from an object O (shown as arrows '1' in FIG. 1) incident on the cloaking device assembly 10 propagates through the first object-side plano-convex lens 100 (shown as arrows '2' in FIG. 1) where it is refracted, exits and propagates to the second object-side plano-convex lens 120 (shown as arrows '3' in FIG. 1). The second object-side plano-convex lens 120 is positioned relative to the object-side end 132 of the coherent image guide 130 such that light 3 propagates through the second object-side plano-convex lens 120 (shown as arrows '4' in FIG. 1A) where it is refracted and propagates to the object-side end 132 (shown as arrows '5' in FIG. 1A). Particularly, light 1 incident on the outward facing convex surface 102 of the first object-side plano-convex lens 100 is refracted and propagates as light 2 (FIG. 1) to the inward facing planar surface 104. Light 2 is refracted at the inward facing planar surface 104 and focused onto the first object-side focal line $f_{100}$ as light 3 (FIGS. 1, 1A). Light 3 diverges and propagates from the first object-side focal line $f_{100}$ to the outward facing planar surface 124 of the second object-side plano-convex lens 120 where it is refracted as light 4 (FIG. 1A). Light 4 propagates through the second object-side plano-convex lens 120 to the inward facing convex surface 122 where it is refracted and focused as parallel light 5 (FIGS. 1, 1A). Parallel light 5 propagates from the inward facing convex surface 122 to the object-side end 132 of the coherent image guide 130, through the optical waveguide 134 of the coherent image guide 130, and exits the image-side end 136 as parallel light (shown as arrows '6' in FIG. 1B).

The image-side end 136 of the coherent image guide 130 is positioned relative to the second image-side plano-convex lens 140 such that parallel light 6 propagating from the image-side end 136 is incident on the second image-side plano-convex lens 140. The second image-side plano-convex lens 140 is positioned relative to the first image-side plano-convex lens 160 such that parallel light 6 propagating through the second image-side plano-convex lens 140 (shown as arrows '7' in FIG. 1B) is refracted, exits, and propagates to the first image-side plano-convex lens 160 (shown as arrows '8' in FIGS. 1, 1B). Light 8 propagates through the first image-side plano-convex lens 160 (shown as arrows '9' in FIG. 1B) and is focused in parallel (shown as arrows '11' in FIG. 1B) to form an image 'I' on the image-side 14 of the cloaking device assembly 10. Particularly, parallel light 6 propagates from the image-side end 136 of the coherent image guide 130 to the inward facing convex surface 142 (FIGS. 1, 1B) of the second image-side plano-convex lens 140 where it is refracted as light 7 (FIG. 1B). Light 7 propagates through the second image-side plano-convex lens 140 to the outward facing planar surface 144 where it is refracted and focused onto the second image-side focal line $f_{140}$ as light 8 (FIGS. 1, 1B). Light 8 diverges and propagates from the second image-side focal line $f_{140}$ to the inward facing planar surface 164 of the first image-side plano-convex lens 160 where it is refracted as light 9 (FIG. 1). Light 9 propagates through the first image-side plano-convex lens 160 to the outward facing convex surface 162 where it is refracted and focused in parallel as light 11 (FIG. 1). Parallel light 11 propagates from the outward facing convex surface 162 to form the image I on the image-side 14 of the cloaking device assembly 10.

Accordingly, light 1 from the object O on the object-side 12 of the cloaking device assembly 10 propagates to the image-side to form the image I on the image-side 14 of the cloaking device assembly 10 via the optical path: object O—first object-side plano-convex lens 100—second object-side plano-convex lens 120—object-side end 132 of coherent image guide 130—image-side end 136 of coherent image guide 130—second image-side plano-convex lens 140—first image-side plano-convex lens 160—Image I. That is, light 1 from the object O propagates to form the image I via the optical path: object O—outward facing convex surface 102 of first object-side plano-convex lens 100—inward facing planar surface 104 of first object-side plano-convex lens 100—outward facing planar surface 124 of second object-side plano-convex lens 120—inward facing convex surface 122 of second object-side plano-convex lens 120—object-side end 132 of coherent image guide 130—image-side end 136 of coherent image guide 130—inward facing convex surface 142 of second image-side plano-convex lens 140—outward facing planar surface 144 of second image-side plano-convex lens 140—inward facing planar surface 164 of first image-side plano-convex lens 160—outward facing convex surface 162 of first image-side plano-convex lens 160—Image I.

Figure 2:
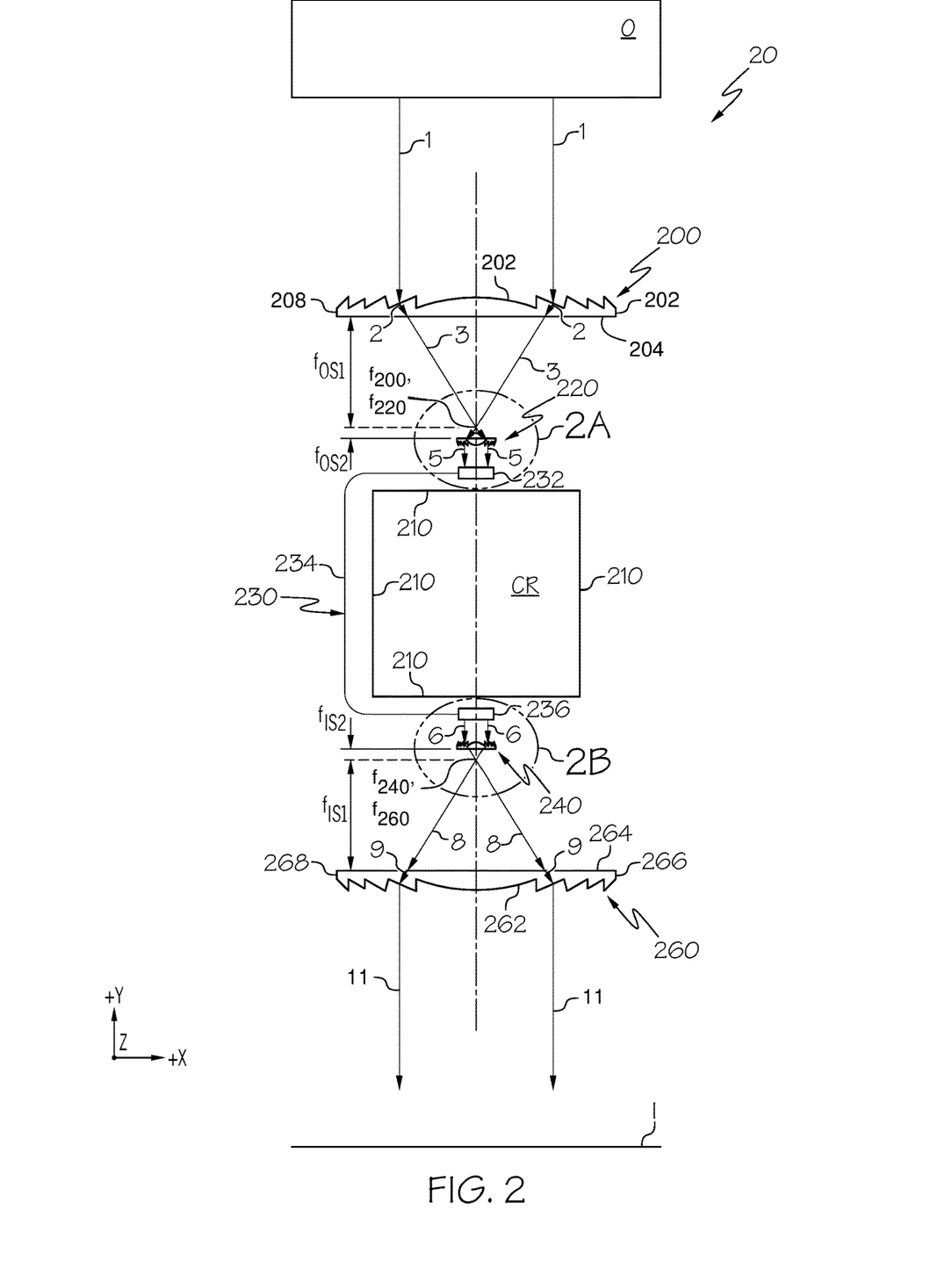
FIG. 2 schematically depicts a top view of a cloaking device according to one or more embodiments disclosed and described herein.

Although FIG. 1 depicts the converging lenses 100, 120, 140, 160 being plano-convex lenses, in some embodiments, the converging lenses 100, 120, 140, 160 are not plano-convex lenses. Particularly, FIG. 2 depicts a cloaking device assembly 20 with converging lenses 200, 220, 240, 260 comprising Fresnel lenses. The cloaking device assembly 20 includes an object-side 22, an image-side 24, and four Fresnel lenses 200, 220, 240, 260. A cloaked region CR is positioned between the Fresnel lenses 200, 220 and the Fresnel lenses 240, 260. Each of the four Fresnel lenses 200, 220, 240, 260 has a length along the X-axis, a thickness along the Y-axis and a height along the Z-axis of the coordinate axes shown in the figures. That is, the X-axis shown in the figures extends along a length of the four Fresnel lenses 200, 220, 240, 260, the Y-axis shown in the figures extends along a thickness of the four Fresnel lenses 200, 220, 240, 260, and the Z-axis shown in the figures extends along a height of the four Fresnel lenses 200, 220, 240, 260. The two Fresnel lenses 200, 220 may be positioned on the object-side 22 of the cloaking device assembly 20 to face an object 'O' and may be referred to herein as object-side Fresnel lenses 200, 220, a pair of object-side Fresnel lenses 200, 220, and/or a first object-side Fresnel lens 200 and a second object-side Fresnel lens 220. The two Fresnel lenses 240, 260 may be positioned on the image-side 24 of the cloaking device assembly 20 to provide an image 'I' formed by the cloaking device assembly 20 and may be referred to herein as image-side Fresnel lenses 240, 260, a pair of image-side Fresnel lenses 240, 260, and/or a first image-side Fresnel lens 260 and a second image-side Fresnel lens 240.

The first object-side Fresnel lens 200 and the first image-side Fresnel lens 260 each have an outward facing Fresnel surface 202, 262 (also referred to herein as a "convex surface"), an inward facing planar surface 204, 264, a first end 206, 266 and a second end 208, 268, respectively. The outward facing convex surfaces 202, 262 and the inward facing planar surfaces 204, 264 of the first object-side Fresnel lens 200 and the first image-side Fresnel lens 260, respectively, extend between the first ends 206, 266 and the second ends 208, 268, respectively. The first object-side Fresnel lens 200 has a first object-side focal length $f_{OS1}$ and the first image-side Fresnel lens 260 has a first image-side focal length $f_{IS1}$. In some embodiments, the first object-side focal length $f_{OS1}$ is equal to the first image-side focal length $f_{IS1}$ (i.e., $f_{OS1}=f_{IS1}$). In other embodiments, the first object-side focal length $f_{OS1}$ is not equal to the first image-side focal length $f_{IS1}$ (i.e., $f_{OS1} \neq f_{IS1}$).

Figure 2A:
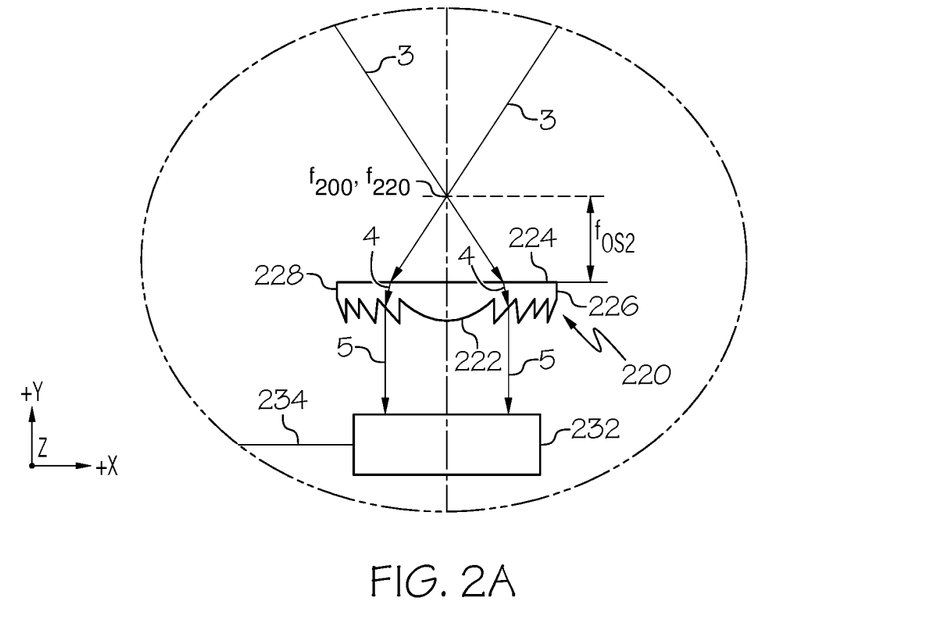
FIG. 2A schematically depicts an enlarged view of section 2A in FIG. 2.
Figure 2B:
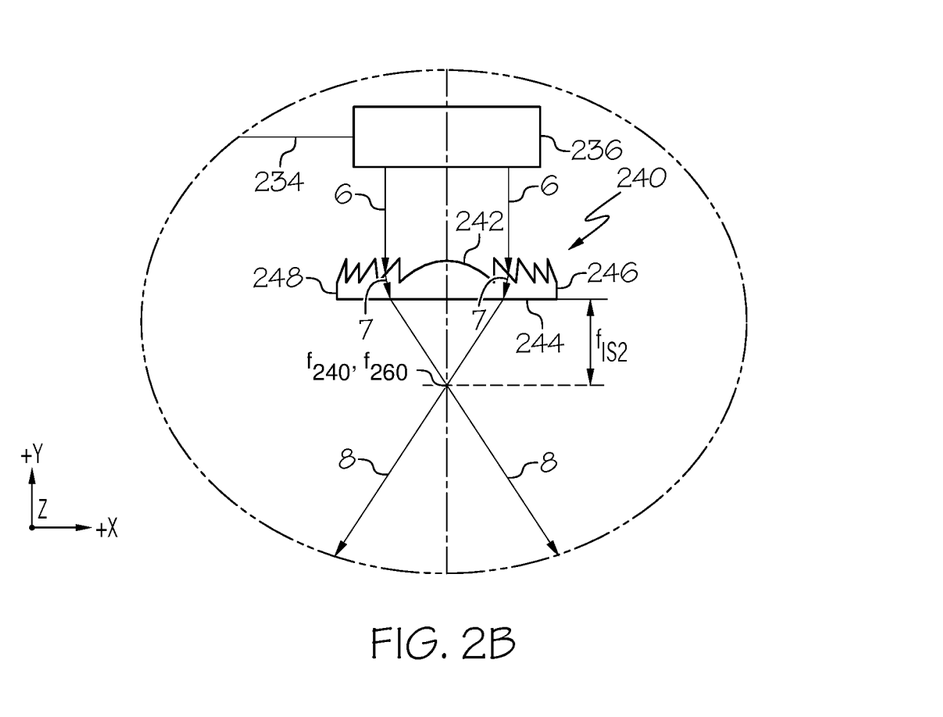
FIG. 2B schematically depicts an enlarged view of section 2B in FIG. 2.

Referring now to FIGS. 2, 2A and 2B, the second object-side Fresnel lens 220 and the second image-side Fresnel lens 240 have an inward facing convex surface 222, 242, an outward facing planar surface 224, 244, a first end 226, 246, and a second end 228, 248, respectively. The inward facing convex surfaces 222, 242 and the outward facing planar surfaces 224, 244 of the second object-side Fresnel lens 220 and the second image-side Fresnel lens 240, respectively, extend between the first ends 226, 246 and the second ends 228, 248, respectively. The second object-side Fresnel lens 220 has a second object-side focal length $f_{OS2}$ and the second image-side Fresnel lens 240 has a second image-side focal length $f_{IS1}$. In some embodiments, the second object-side focal length $f_{OS2}$ is equal to the second image-side focal length $f_{IS2}$ (i.e., $f_{OS2}=f_{IS2}$). In other embodiments, the second object-side focal length $f_{OS2}$ is not equal to the second image-side focal length $f_{IS2}$ (i.e., $f_{OS2} \neq f_{IS2}$).

In some embodiments, the cloaked region CR may be at least partially bounded by a boundary 210. For example, the cloaked region CR may be at least partially bounded by a plurality of boundaries 210. In such embodiments, the cloaked region CR may comprise an article to be cloaked (not shown) and the article may comprise one or more boundaries 110. Extending from the object-side 22 to the image-side 24 is a coherent image guide 230. Particularly, the coherent image guide 230 comprises an object-side end 232 optically aligned with the second object-side Fresnel lens 220, an image-side end 236 optically aligned with the second image-side Fresnel lens 240, and an optical waveguide 234 extending between the object-side end 232 and the image-side end 236. In some embodiments, the coherent image guide 230 extends around the cloaked region CR from the object-side 22 to the image-side 24 as depicted in FIG. 2. In other embodiments, the coherent image guide 230 extends through at least a portion of the cloaked region CR from the object-side 22 to the image-side 24 (not shown).

In some embodiments, the Fresnel lenses 200, 220, 240, 260, may be a cylindrical Fresnel lenses with a cross-section in the X-Z plane depicted in the figures in the shape of a rectangle. In such embodiments, the first object-side Fresnel lens 200 may comprise a first object-side focal line $f_{200}$ extending along the Z-axis and positioned inwardly (-Y direction) from the first object-side Fresnel lens 200 at the first object-side focal length $f_{OS1}$, and the first image-side Fresnel lens 260 may comprise a first image-side focal line $f_{260}$ extending along the Z-axis and positioned inwardly (+Y direction) from the first image-side Fresnel lens 260 at the first image-side focal length $f_{IS1}$. Also, the second object-side Fresnel lens 220 may comprise a second object-side focal line $f_{220}$ extending along the Z-axis and positioned outwardly (+Y direction) from the second object-side Fresnel lens 220 at the second object-side focal length $f_{OS2}$ and the second image-side Fresnel lens 240 may comprise a second image-side focal line $f_{240}$ extending along the Z-axis and positioned outwardly (-Y direction) from the second image-side Fresnel lens 240 at the second image-side focal length $f_{IS2}$. As depicted in FIGS. 2 and 2A, the first object-side Fresnel lens 200 is oriented relative to the second object-side Fresnel lens 220 such that the first object-side focal line $f_{200}$ and the second object-side focal line $f_{220}$ are collinear. As depicted in FIGS. 2 and 2B, the first image-side Fresnel lens 260 is oriented relative to the second image-side Fresnel lens 240 such that the first image-side focal line $f_{260}$ and the second image-side focal line $f_{240}$ are collinear. Accordingly, the first object-side Fresnel lens 200 and the second object-side Fresnel lens 220 may be spaced apart from each other (Y direction) by a distance equal to the sum of the first object-side focal length $f_{OS1}$ and the second object-side focal length $f_{OS2}$ (i.e., the spacing is $f_{OS1}+f_{OS2}$). Also, the first image-side Fresnel lens 260 and the second image-side Fresnel lens 240 may be spaced apart from each other (Y direction) by a distance equal the sum of the first image-side focal length $f_{IS1}$ and the second image-side focal length $f_{IS2}$ (i.e., the spacing is $f_{IS1}+f_{IS2}$).

Still referring to FIG. 2, in other embodiments, the Fresnel lenses 200, 220, 240, 260 may be spherical Fresnel lenses with a cross-section in the X-Z plane depicted in the figures in the shape of a circle. In such embodiments, the first object-side Fresnel lens 200 may comprise a first object-side focal point $f_{200}$ positioned inwardly (-Y direction) from the first object-side Fresnel lens 200 at the first object-side focal length $f_{OS1}$, and the first image-side Fresnel lens 260 may comprise a first image-side focal point $f_{260}$ positioned inwardly (+Y direction) from the first image-side Fresnel lens 260 at the first image-side focal length $f_{IS1}$. Also, the second object-side Fresnel lens 220 may comprise a second object-side focal point $f_{220}$ positioned outwardly (+Y direction) from the second object-side Fresnel lens 220 at the second object-side focal length $f_{OS2}$ and the second image-side Fresnel lens 240 may comprise a second image-side focal point $f_{240}$ positioned outwardly (-Y direction) from the second image-side Fresnel lens 240 at the second image-side focal length $f_{IS2}$. As depicted in FIG. 2, the first object-side Fresnel lens 200 may be oriented relative to the second object-side Fresnel lens 220 such that the first object-side focal point $f_{200}$ and the second object-side focal point $f_{220}$ are the same focal point. Also, the first image-side Fresnel lens 260 may be oriented relative to the second image-side Fresnel lens 240 such that the first image-side focal point $f_{260}$ and the second image-side focal point $f_{240}$ are the same focal point.

In embodiments where the Fresnel lenses 200, 220, 240, 260 are cylindrical Fresnel lenses, the coherent image guide 230 may be a coherent image ribbon with a width extending along the Z-axis depicted in figures. That is, the coherent image guide 230 may be formed from a plurality of coherent image fiber bundles, light pipes, optical fibers, etc., aligned to form a ribbon with a width (Z direction) that is greater than a thickness (X and Y directions). In embodiments where the Fresnel lenses 200, 220, 240, 260 are spherical Fresnel lenses, the coherent image guide 230 may be a coherent image cable. That is, the coherent image guide 230 may be formed from one or more image fiber bundles in the shape of a cylindrical cable, light pipe, etc.

The Fresnel lenses 200, 220, 240, 260, and other Fresnel lenses disclosed herein, may be formed from any lens material suitable for focusing light rays. Non-limiting examples of suitable plano-convex lens materials include glass, acrylic polymers, polycarbonate polymers and rigid vinyl polymers.

The first object-side Fresnel lens 200 is positioned relative to the second object-side Fresnel lens 220 such that light from an object O (shown as arrows '1' in FIG. 2) incident on the cloaking device assembly 20 propagates through the first object-side Fresnel lens 200 (shown as arrows '2' in FIG. 2) where it is refracted, exits and propagates to the second object-side Fresnel lens 220 (shown as arrows '3' in FIG. 2). The second object-side Fresnel lens 220 is positioned relative to the object-side end 232 of the coherent image guide 230 such that light 3 propagates through the second object-side Fresnel lens 220 (shown as arrows '4' in FIG. 2A) where it is refracted and propagates to the object-side end 232 (shown as arrows '5' in FIG. 2A). Particularly, light 1 incident on the outward facing convex surface 202 of the first object-side Fresnel lens 200 is refracted and propagates as light 2 (FIG. 2) to the inward facing planar surface 204. Light 2 is refracted at the inward facing planar surface 204 and focused onto the first object-side focal line $f_{200}$ as light 3 (FIGS. 2, 2A). Light 3 diverges and propagates from the first object-side focal line $f_{200}$ to the outward facing planar surface 224 of the second object-side Fresnel lens 220 where it is refracted as light 4 (FIG. 2A). Light 4 propagates through the second object-side Fresnel lens 220 to the inward facing convex surface 222 where it is refracted and focused as parallel light 5 (FIGS. 2, 2A). Parallel light 5 propagates from the inward facing convex surface 222 to the object-side end 232 of the coherent image guide 230, through the optical waveguide 234 of the coherent image guide 230, and exits the image-side end 236 as parallel light (shown as arrows '6' in FIG. 2B).

The image-side end 236 of the coherent image guide 230 is positioned relative to the second image-side Fresnel lens 240 such that parallel light 6 propagating from the image-side end 236 is incident on the second image-side Fresnel lens 240. The second image-side Fresnel lens 240 is positioned relative to the first image-side Fresnel lens 260 such that parallel light 6 propagating through the second image-side Fresnel lens 240 (shown as arrows '7' in FIG. 2B) is refracted, exits, and propagates to the first image-side Fresnel lens 260 (shown as arrows '8' in FIGS. 2, 2B). Light 8 propagates through the first image-side Fresnel lens 260 (shown as arrows '9' in FIG. 2B) and is focused in parallel (shown as arrows '11' in FIG. 2B) to form an image 'I' on the image-side 24 of the cloaking device assembly 20. Particularly, parallel light 6 propagates from the image-side end 236 of the coherent image guide 230 to the inward facing convex surface 242 (FIG. 2B) of the second image-side Fresnel lens 240 where it is refracted as light 7. Light 7 propagates through the second image-side Fresnel lens 240 to the outward facing planar surface 244 where it is refracted and focused onto the second image-side focal line $f_{240}$ as light 8 (FIGS. 2, 2B). Light 8 diverges and propagates from the second image-side focal line $f_{240}$ to the inward facing planar surface 264 of the first image-side Fresnel lens 260 where it is refracted as light 9 (FIG. 2). Light 9 propagates through the first image-side Fresnel lens 260 to the outward facing convex surface 262 where it is refracted and focused in parallel as light 11 (FIG. 2). Parallel light 11 propagates from the outward facing convex surface 262 to form the image I on the image-side 24 of the cloaking device assembly 20.

Accordingly, light 1 from the object O on the object-side 22 of the cloaking device assembly 20 propagates to the image-side to form the image I on the image-side 24 of the cloaking device assembly 20 via the optical path: object O—first object-side Fresnel lens 200—second object-side Fresnel lens 220—object-side end 232 of coherent image guide 230—image-side end 236 of coherent image guide 230—second image-side Fresnel lens 240—first image-side Fresnel lens 260—Image I. That is, light 1 from the object O propagates to form the image I via the optical path: object O—outward facing convex surface 202 of first object-side Fresnel lens 200—inward facing planar surface 204 of first object-side Fresnel lens 200—outward facing planar surface 224 of second object-side Fresnel lens 220—inward facing convex surface 222 of second object-side Fresnel lens 220—object-side end 232 of coherent image guide 230—image-side end 236 of coherent image guide 230—inward facing convex surface 242 of second image-side Fresnel lens 240—outward facing planar surface 244 of second image-side Fresnel lens 240—inward facing planar surface 264 of first image-side Fresnel lens 260—outward facing convex surface 262 of first image-side Fresnel lens 260—Image I.

Figure 3:
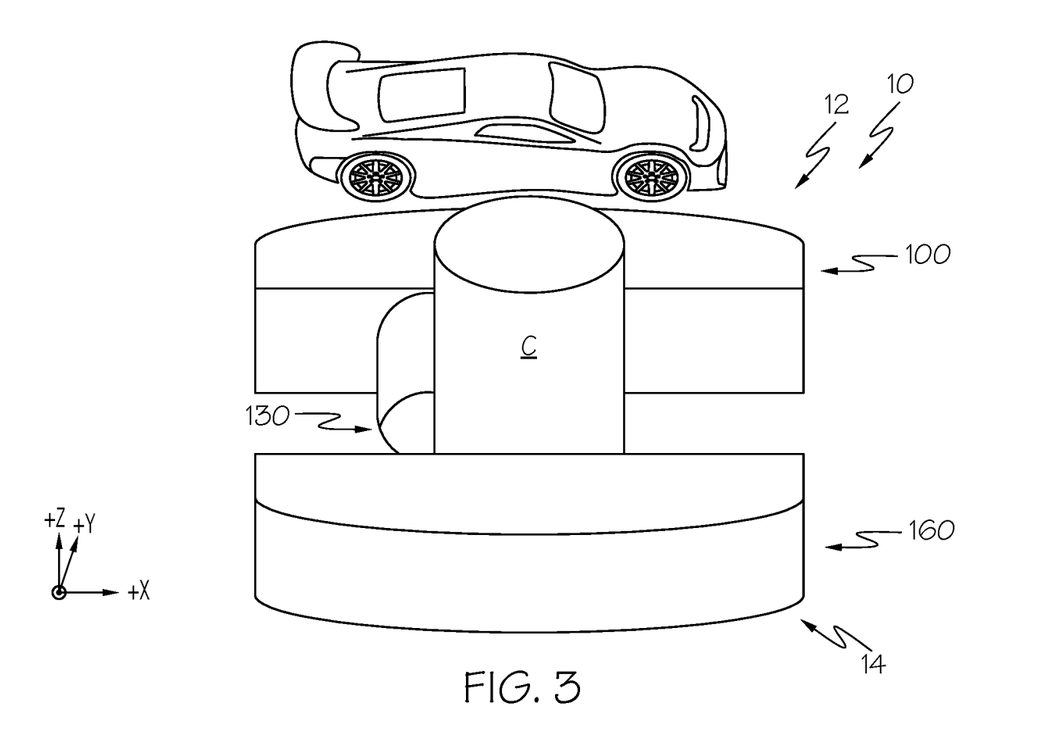
FIG. 3 schematically depicts a top perspective view of the cloaking device of FIG. 1 with a first object on one side of the cloaking device and a second object within the cloaked region of the cloaking device according to one or more embodiments disclosed and described herein.
Figure 4:
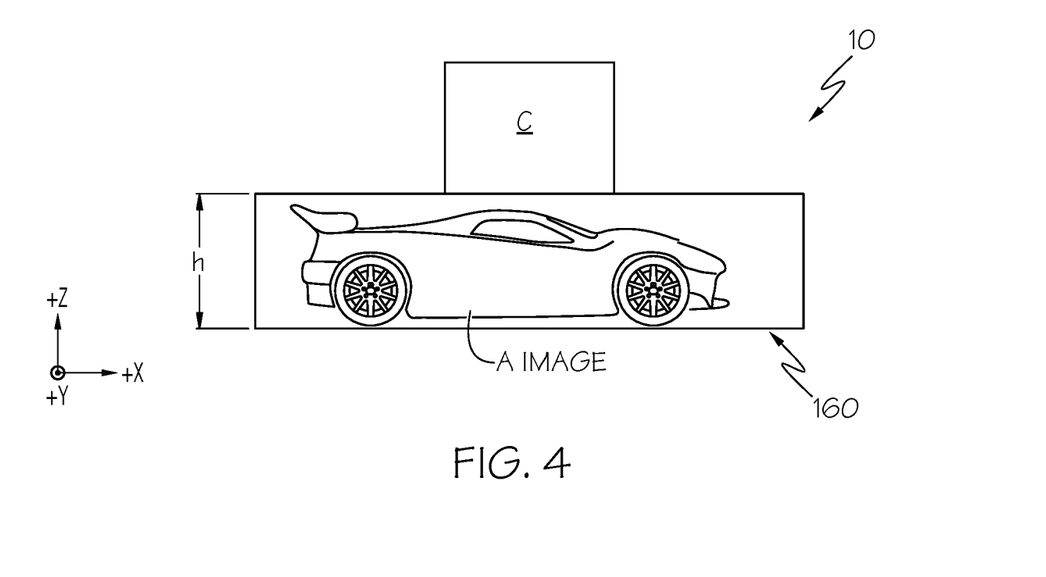
FIG. 4 schematically depicts a side view of the cloaking device of FIG. 1 with the first object on one side of the cloaking device and the second object within the cloaked region of the cloaking device.

Referring now to FIGS. 1, 3 and 4, a top perspective view and a side view of a cloaking device according to embodiments as discussed with respect to FIG. 1 are shown in FIGS. 3 and 4, respectively. Specifically, FIG. 3 is a top perspective view of an article in the form of a column 'C' within the cloaked region CR of the cloaking device assembly 10 and an automobile 'A' located behind the column C on the object-side 12 of the cloaking device assembly 10 in the +Y direction. The column C has a height dimension in the Z direction (increasing height in the +Z direction) greater than the height h of the cloaking device (FIG. 4). FIG. 4 is a side view from the +Y direction of the cloaking device assembly 10 shown in FIG. 1 and shows the portion of the column C that is within the cloaked region is not visible and the automobile A located behind the column C in the +Y direction is visible to an observer viewing the cloaking device assembly 10 in the +Y direction. Accordingly, the column C positioned within the cloaked region is not visible to an observer viewing the image-side 14 of the cloaking device assembly 10 and an image of the automobile A is visible to the observer viewing the image-side 14. Although column C in FIGS. 4 and 5 is separate from the cloaked region CR boundaries 110, i.e., column C is a separate object from the cloaking device assembly 10, it should be appreciated that column C may be structurally part of cloaking device assembly 10 and have an outer surface that provides or is equivalent to the cloaked region CR boundaries 110.

Figure 5:
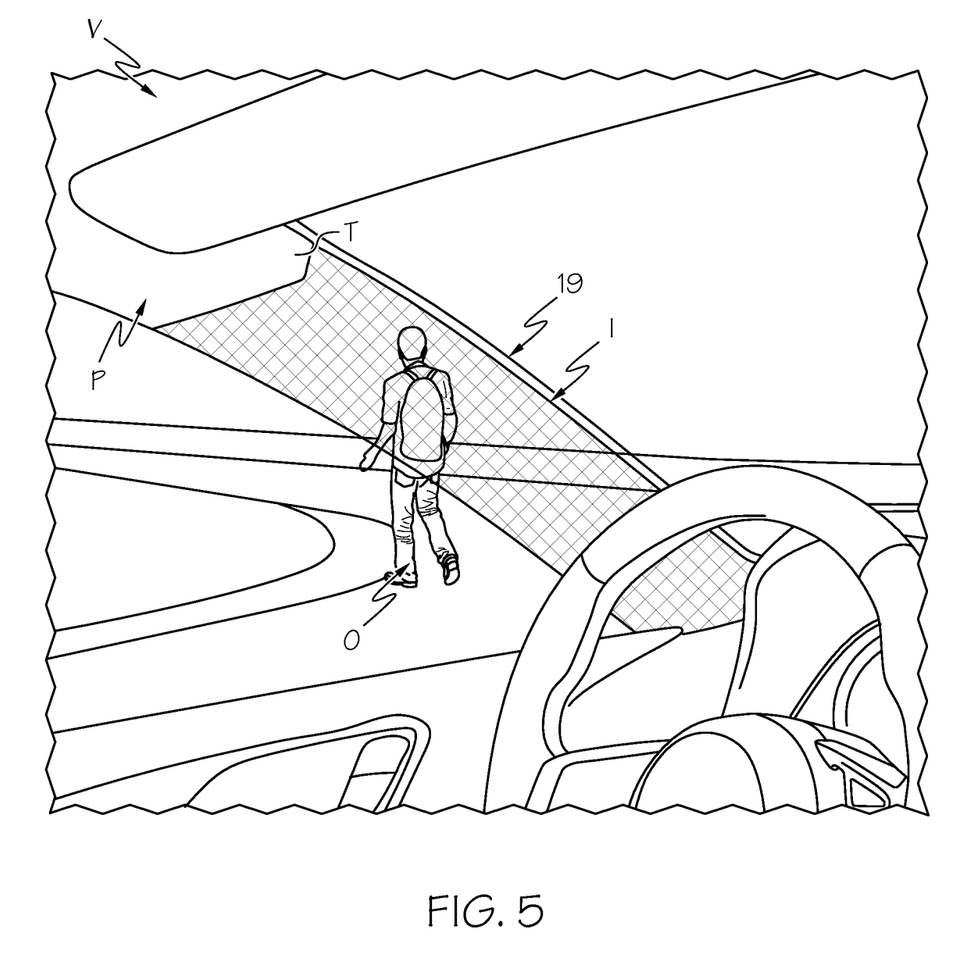
FIG. 5 schematically depicts a cloaking device cloaking a vehicle A-pillar of a vehicle according to one or more embodiments described and illustrated herein.

Referring to FIG. 5, embodiments of a pillar of a vehicle being cloaked by a cloaking device are shown. Particularly, FIG. 5 shows a cloaking device 19 as described herein cloaking a portion of a pillar P of a vehicle V. In some embodiments, the pillar P is an A-pillar. In other embodiments, the pillar P is a B-pillar. In still other embodiments, the pillar P is a C-pillar. A portion of the pillar P is positioned within a cloaked region (not shown) of the cloaking device 19 and a portion of the pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the pillar P cloaked by the cloaking device 19. The cloaking device 19 redirects light reflected from the pedestrian O around the pillar P positioned within the cloaked region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the pillar P and a blind spot typically created by the pillar P is not as present as when the portion of the pillar P is not positioned within the cloaked region of the cloaking device 19. In embodiments, the pillar P itself serves as the cloaked region, i.e. the pillar P has an outer surface with one or more inward facing surfaces that assist in redirecting light from the pedestrian) around the pillar P. It should be appreciated that cloaking of the pillar P with the cloaking device 19 and bypassing the blind spot produced by the pillar P is performed without the use of metamaterials, video images, cameras, sophisticated electronics, etc.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object" and "article," may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking device assembly with a cloaked region bounded by four plano-convex lenses or four Fresnel lenses, cloaking assemblies with a cloaked region bounded by two plano-convex lenses and two Fresnel lenses are provided. For example and without limitation, a cloaking device assembly may comprise a pair of object-side plano-convex lenses and a pair of image-side Fresnel lenses, or in the alternative, a pair of object-side Fresnel lenses and a pair of image-side plano-convex lenses.

Directional terms as used herein—for example top and bottom—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side, an image-side, and a cloaked region positioned between the object-side and the image-side;
   a first object-side converging lens with a first object-side focal length and a second object-side converging lens with a second object-side focal length positioned on the object-side, wherein the first object-side converging lens is positioned outwardly from the second object-side converging lens relative to the cloaked region;
   a first image-side converging lens with a first image-side focal length and a second image-side converging lens with a second image-side focal length positioned on the image-side, wherein the first image-side converging lens is positioned outwardly from the second image-side converging lens relative to the cloaked region; and
   a coherent image guide comprising an object-side end and an image-side end, wherein the object-side end is optically aligned with the second object-side converging lens and the image-side end is optically aligned with the second image-side converging lens;
   wherein light from an object positioned on the object-side of the cloaking device and obscured by the cloaked region is focused in parallel onto the object-side end of the coherent image guide by the first object-side converging lens and the second object-side converging lens, propagates through the coherent image guide to the image-side end of the coherent image guide, and is focused in parallel by the second image-side converging lens and the first image-side converging lens to form an image of the object on the image-side of the cloaking device such that the light from the object appears to pass through the cloaked region,
   wherein the first object-side focal length is greater than the second object-side focal length and the first image-side focal length is greater than the second image-side focal length.

2. The cloaking device of claim 1, wherein the first object-side converging lens and the second object-side converging lens are spaced apart from each other by a distance equal to the sum of the first object-side focal length and the second object-side focal length, and the first image-side converging lens and the second image-side converging lens are spaced apart from each by a distance equal to the sum of the first image-side focal length and the second image-side focal length.

3. The cloaking device of claim 1, wherein:
   the first object-side converging lens comprises a first object-side focal line, the second object-side converging lens comprises a second object-side focal line; and
   the first object-side focal line and the second object-side focal line are positioned between the first object-side converging lens and the second object-side converging lens.

4. The cloaking device of claim 3, wherein the first object-side focal line and the second object-side focal line are collinear.

5. The cloaking device of claim 3, wherein:
   the first image-side converging lens comprises a first image-side focal line, and the second image-side converging lens comprises a second image-side focal line; and
   the first image-side focal line and the second image-side focal line are positioned between the first image-side converging lens and the second image-side converging lens.

6. The cloaking device of claim 5, wherein the first image-side focal line and the second image-side focal line are collinear.

7. The cloaking device of claim 5, wherein:
   the first object-side converging lens comprises an outward facing convex surface and an inward facing planar surface, and the second object-side converging lens comprises an inward facing convex surface and an outward facing planar surface; and
   the first image-side converging lens comprises an outward facing convex surface and an inward facing planar surface, and the second image-side converging lens comprises an inward facing convex surface and an outward facing planar surface.

8. The cloaking device of claim 7, wherein light from the object:
- is focused onto the first object-side focal line by the first object-side converging lens;
- diverges between the first object-side focal line and the outward facing planar surface of the second object-side converging lens;
- is focused in parallel onto the object-side of the coherent image guide by the second object-side converging lens;
- exits the image-side end of the coherent image guide and propagates parallel to the inward facing convex surface of the second image-side converging lens;
- is focused onto the second image-side focal line by the second image-side converging lens;
- diverges between the second image-side focal line and the inward facing planar surface of the first image-side converging lens; and
- is focused in parallel by the first image-side converging lens to form the image of the object on the image-side of the cloaking device.

9. The cloaking device of claim 1, wherein the first object-side converging lens, the second object-side converging lens, the first image-side converging lens and the second image-side converging lens are plano-convex lenses, Fresnel lenses, or a combination of plano-convex lenses and Fresnel lenses.

10. The cloaking device of claim 1, wherein the coherent image guide comprises at least one of a light pipe and an optical fiber.

11. The cloaking device of claim 1, wherein light propagates through the cloaking device via an optical path of: object—first object-side converging lens—second object-side converging lens—object-side end of coherent image guide—image-side end of coherent image guide—second image-side converging lens—first image-side converging lens—image.

12. The cloaking device of claim 1, wherein light propagates through the cloaking device via an optical path of: object—outward facing convex surface of first object-side converging lens—inward facing planar surface of first object-side converging lens—outward facing planar surface of second object-side converging lens—inward facing convex surface of second object-side converging lens—object-side end of coherent image guide—image-side end of coherent image guide—inward facing convex surface of second image-side converging lens—outward facing planar surface of second image-side converging lens—inward facing planar surface of first image-side converging lens—outward facing convex surface of first image-side converging lens—image.

13. A cloaking device assembly comprising:
- an object-side, an image-side, a cloaked region positioned between the object-side and the image-side, a cloaked article positioned within the cloaked region;
- a pair of object-side converging lenses positioned on the object-side, wherein the pair of object-side converging lenses each have an object-side focal length and an object-side focal line positioned at the object-side focal length, one of the pair of object-side converging lenses is spaced outwardly from another of the pair of object-side converging lenses relative to the cloaked region, and the pair of object-side converging lenses are spaced apart from each other by a distance equal to the sum of the object-side focal lengths of the pair of object-side converging lenses;
- a pair of image-side converging lenses, wherein the pair of image-side converging lenses each have an image-side focal length and an image-side focal line positioned at the image-side focal length, one of the pair of image-side converging lenses is spaced outwardly from another of the pair of image-side converging lenses relative to the cloaked region, and the pair of image-side converging lenses are spaced apart from each other by a distance equal to the sum of the image-side focal lengths of the pair of image-side converging lenses; and
- a coherent image guide comprising an object-side end and an image-side end, wherein the object-side end is optically aligned with the pair of object-side converging lenses and the image-side end is optically aligned with the pair of image-side converging lenses;
- wherein light from an object positioned on the object-side of the cloaking device assembly and obscured by the cloaked region is focused in parallel onto the object-side end of the coherent image guide by the pair of object-side converging lenses, propagates through the coherent image guide to the image-side end of the coherent image guide, and is focused in parallel by the pair of image-side converging lenses to form an image of the object on the image-side of the cloaking device assembly such that the light from the object appears to pass through the cloaked region,
- wherein the first object-side focal length is greater than the second object-side focal length and the first image-side focal length is greater than the second image-side focal length.

14. The cloaking device assembly of claim 13, wherein:
- one of the pair of object-side converging lenses comprises an outward facing convex surface and an inward facing planar surface, and another of the pair of object-side converging lenses comprises an inward facing convex surface and an outward facing planar surface; and
- one of the pair of image-side converging lenses comprises an outward facing convex surface and an inward facing planar surface, and another of the pair of image-side converging lenses comprises an inward facing convex surface and an outward facing planar surface.

15. The cloaking device assembly of claim 13, wherein light propagates through the cloaking device assembly via an optical path of: object—one of the pair of object-side converging lens—another of the pair of object-side converging lens—object-side end of coherent image guide—image-side end of coherent image guide—one of the pair of converging lens—another of the pair of converging lens—image.

16. A vehicle comprising:
- an A-pillar; and
- a cloaking device positioned on the A-pillar, the cloaking device comprising:
- an object-side, an image-side, and a cloaked region, wherein the A-pillar is positioned within the cloaked region, the object-side is positioned on an exterior of the vehicle and the image-side is positioned within an interior of the vehicle;
- a first object-side converging lens with a first object-side focal length and a second object-side converging lens with a second object-side focal length, wherein the first object-side converging lens and the second object-side converging lens are optically aligned and spaced apart from each other by a distance equal to the sum of the first object-side focal length and the second object-side focal length;
- a first image-side converging lens with a first image-side focal length and a second image-side converging lens with a second image-side focal length, wherein the first image-side converging lens and the second image-side converging lens are optically aligned and spaced apart from each by a distance equal to the sum of the first image-side focal length and the second image-side focal length; and a coherent image guide comprising an object-side end and an image-side end, wherein the object-side end is optically aligned with the second object-side converging lens and the image-side end is optically aligned with the second image-side converging lens;

wherein light from an object positioned on the object-side of the cloaking device and obscured by the cloaked region is focused in parallel onto the object-side end of the coherent image guide by the first object-side converging lens and the second object-side converging lens, propagates through the coherent image guide to the image-side end of the coherent image guide, and is focused in parallel by the second image-side converging lens and the first image-side converging lens to form an image of the object on the image-side of the cloaking device such that the light from the object appears to pass through the cloaked region.

17. The vehicle of claim 16, wherein:
the first object-side converging lens comprises an outward facing convex surface and an inward facing planar surface, and the second object-side converging lens comprises an inward facing convex surface and an outward facing planar surface; and
the first image-side converging lens comprises an outward facing convex surface and an inward facing planar surface, and the second image-side converging lens comprises an inward facing convex surface and an outward facing planar surface.

18. The cloaking device of claim 16, wherein:
the first object-side converging lens comprises a first object-side focal line, the second object-side converging lens comprises a second object-side focal line, the first image-side converging lens comprises a first image-side focal line, and the second image-side converging lens comprises a second image-side focal line;
the first object-side focal line and the second object-side focal line are positioned between the first object-side converging lens and the second object-side converging lens;
the first image-side focal line and the second image-side focal line are positioned between the first image-side converging lens and the second image-side converging lens; and
the first object-side focal line and the second object-side focal line are collinear, and the first image-side focal line and the second image-side focal line are collinear.

19. The vehicle of claim 16, wherein light propagates through the cloaking device via an optical path of: object—first object-side converging lens—second object-side converging lens—object-side end of coherent image guide—image-side end of coherent image guide—second image-side converging lens—first image-side converging lens—image.

20. The cloaking device of claim 5, wherein the cloaking device is configured so that light from the object through the cloaking device consists of the following path:
focused onto the first object-side focal line by the first object-side converging lens;
diverges between the first object-side focal line and the second object-side converging lens;
is focused in parallel onto the object-side of the coherent image guide by the second object-side converging lens;
exits the image-side end of the coherent image guide and propagates parallel to the second image-side converging lens;
is focused onto the second image-side focal line by the second image-side converging lens;
diverges between the second image-side focal line and the first image-side converging lens; and
is focused in parallel by the first image-side converging lens to form the image of the object on the image-side of the cloaking device,
wherein the coherent image guide consists of one of a light pipe and an optical fiber.

* * * * *